Patented Sept. 23, 1930

1,776,366

UNITED STATES PATENT OFFICE

EMIL E. NOVOTNY, OF PHILADELPHIA, PENNSYLVANIA, ASSIGNOR TO JOHN STOG-DELL STOKES, OF SPRING VALLEY FARMS, HUNTINGDON VALLEY P. O., PENNSYL-VANIA

METHOD OF MAKING HOLLOW OBJECTS OF SYNTHETIC RESIN MATERIALS

No Drawing. Original application filed August 26, 1926, Serial No. 131,817. Divided and this application filed August 12, 1927. Serial No. 212,608.

This invention relates to the manufacture of synthetic resins and products therefrom and the method of manufacturing the same. Specifically, it is directed to the manufacture of very reactive resinous products which ordinarily have poor keeping qualities at room temperature.

This application is directed to a potentially reactive resinous product or compound having a cooling medium incorporated therewith and the method including broadly the step in the art whereby products of a resinous nature of relatively high reactivity can be retained in their potentially reactive or fusible and in some cases soluble form for a sufficient length of time to be subsequently converted into infusible bodies of solid, homogeneous and useful forms. The products may be preserved in their potentially reactive form as a varnish, lacquer, lacquer body material, or as a resin in a preferred state of hardness, melting point or viscosity or various compounds including a reactive resinous product mixed with fillers, lubricants, modifying agents, dyes, pigments, etc.

This application is a division of my prior application Serial No. 131,817, filed August 26, 1926, and entitled "Synthetic resin products and method of making the same."

The early resin art shows many examples or synthetic resin products formed under reacting conditions too energetic to be carried out at room temperature; therefore the products resulting from such reactions or reacting conditions were in an infusible and insoluble state. The early work of many investigators with phenolic bodies and various aldehydes and substitutes therefor met with commercial failure because the products were too energetic to control and maintain at room temperature in a useful state of fusibility or solubility.

The success of the present synthetic resin industry and of the products and methods is due in a large measure to the controlling of reactions whereby resinous products are formed which are relatively slow in reaction and having practically no commercial speed of reactivity at ordinary room temperature. In the present commercial practice the final infusible products are usually formed or molded at temperatures well above 320° F. Even at this elevated temperature, however, the reaction is too slow to compete in speed with the per diem production obtained from a mold or from an operator when compared with the output possible where ordinary thermoplastic products are molded such as, for example, shellac and not to mention cold molding processes.

There are many synthetic resinous products that will react to infusibility at room temperature. In some cases the reaction goes to completion at these temperatures and then, again, in other cases an exothermic reaction sets in at say room temperature, whereby the mass is elevated in temperature due to such reaction, and the products, therefore, form infusible or insoluble resinous products without further heating.

There are other resinous bodies usually made with a deficiency of aldehyde or hardening agent having good keeping qualities at ordinary room temperature which may be shipped and kept in stock for a long period of time without undergoing material changes in composition or structure which may subsequently be speeded in their reactivity by the addition of suitable catalytic agents or by supplying the deficiency of hardening agent or the aldehyde body and which thereby become unstable at ordinary room temperature because of their high rates of reactivity. These products, of course, can be shipped to distant points, kept in stock; and fillers, etc., may be incorporated therewith. Subsequently the reaction may be accelerated to the point where the products must be cooled to temperatures low enough to materially stabilize the reaction until such time as the products are finally formed and used. Under some conditions, where the resins are made in one establishment and shipped to the ultimate user, this procedure is a highly satisfactory one.

On the other hand, it is possible to start off with the original reagents, first introducing one reagent into the filler body and subsequently adding the other reacting products while cooling such mixture to the point where the reaction is controllable, and decreasing the temperature of the compound until the reaction is practically stopped and cooling for such a length of time as necessary to keep the products ready for use, whereupon the removal of the cooling medium or the application of heat will cause the reaction to ensue. In some cases it is preferable to combine the resin forming reagents, cool the mixture sufficiently to either hold the reaction at the desired reaction stage, the catalyst being added after the reagents have been cooled sufficiently, or the cooling is maintained to such an extent that the reaction takes place in the fillers, and may be held in check by continued cooling until it is desired to have the reaction proceed to its final infusible form. By thus combining the reagents a solution is usually formed and no other solvents are required. Where the products require an additional solvent it may be added if a solution is wanted.

The products can be used in various ways as by being applied as a surface coating or lacquer, by being impregnated into various absorbent materials such as paper or textile fabrics, by being mixed with various comminuted fillers, etc.

Refrigeration has now progressed to the point where it is possible to maintain uniform temperatures well below the reacting temperatures of the most energetic of these synthetic resin reactions. For that matter, ordinary ice refrigeration may be utilized so long as the materials or products are kept in suitable containers or condition whereby moisture will not readily be absorbed by them. On the other hand, commercial developments have been made in mechanical refrigeration units so that dry refrigeration is a simple matter indeed and offers no difficulties so far as the controlling of the reaction is concerned even though such control must be maintained for days or weeks. Furthermore, it is now possible to obtain dry refrigeration in a very economical manner as by the use of various solidified gaseous products such as, for example, the product known as dry ice or carbon dioxide ($CO_2$). This product is very convenient for use as it offers several distinct advantages over other forms of refrigeration.

Where a dry ice or suitable dry refrigerating medium is used it may, of course, be applied to the outside of containers or may be incorporated directly with the product, and when properly distributed will maintain a uniform temperature throughout the mass, obviating any possibilities of local reactions taking place which would tend to raise the temperature of the resinous mass despite cooling means applied to the outside of a container. This is of extreme importance where a considerable quantity of product may be shipped at one time and where the product itself is a poor conductor of heat, in that a large mass of material may develop a reaction which would raise the temperature beyond control faster than the heat could be removed from the reacting mass.

The use of carbon dioxide ice offers advantages in other ways in that the carbon dioxide gas may be caused to be liberated within the center of a mold or die, thus forming hollow molded pieces where a die of close fitting dimensions is used. This may readily be done by introducing a preformed piece of carbon dioxide ice into the center of a preformed piece of synthetic resin product or other suitable molding material. Upon heating, a large quantity of the gas will be liberated and this will force the molding product to the outside walls of the die, forming a hollow molded object. This method can be well utilized for such purposes as the manufacture of hollow gear shift balls or may take the place of various odd shaped core pieces.

The $CO_2$ ice may likewise be used in such small quantities and may be so thoroughly intermixed with the molding product that there will be no objection to the gas being formed in situ, and with the ordinary type of mold the gas will be readily liberated from the mold cavity and the piece. However, where it is to be combined this may readily take place by the addition of suitable combining ingredients such as, for example, calcium oxide or hydroxide, which will combine with the carbon dioxide and form calcium carbonate, an inert filler. Therefore, as the temperature of the product is increased the $CO_2$ gas is liberated and this gas is caused to react with the combining agent.

In the following examples only a few resins are illustrated as it is to be understood that the examples given, so far as the resin compounds are concerned, are more by way of illustration than detailed exact steps to be followed. It is to be understood that most of the aldehydes when in the presence of suitable combining bodies and catalysts can be made to react very energetically. Now if these resinous products are thoroughly and uniformly cooled in order to control the reaction, useful resinous products of a potentially reactive, fusible and, if desired, soluble form result. By further cooling of the product the reaction will be interrupted and by maintaining the cooling the said reaction products will remain in substantially their potentially reactive form while said cooling is maintained. By removing the cooling medium and or on subsequent heating the reaction is resumed until the final infusible products are formed. This final reaction may take place at room temperature or very rapidly at elevated temperatures.

*Example No. 1*

Resorcin _____ 1.80
Paraformaldehyde _____ .915
Wood flour _____ 2.71
Dry ice _____ .50

All parts by weight. The product is thoroughly mixed in any suitable manner and if the dry ice were not present the product would go to infusibility before a molding operation could be resorted to. With the dry ice in situ, however, the reaction is very readily controlled and a thorough coating and mixing is to be had. The ingredients may be molded in various ways as, for example, they may be fed into the hopper of an ordinary preforming press, whereby various molded shapes can quickly be made. By allowing the tablets thus formed to stand at room or elevated temperature, the dry ice will vaporize and the reaction will ensue. The same tablets or, for that matter, comminuted powder may be placed into a die and the die may be heated to any desired temperature, when the dry ice will be quickly vaporized and the reaction take place. Under these conditions of molding and at a temperature of about 300° F. on the die a 1¼″ diameter disc by ¼″ in thickness was molded to its final hard, set and infusible form in about ¼ minute curing time and the product was so completely cured that it could be removed from the die without cooling. The amount of wood flour, of course, and the amount of dry ice may be varied considerably in order to take care of the desired type of product and also to take care of the lag in operations.

Example No. 2

Resorcin _____ 1.80
Paraformaldehyde _____ .915

All parts by weight. Place in a suitable digester provided with a stirring device and heat gradually until a reaction ensues. This will take place at a temperature of somewhat less than 212° F. The reaction, however, is very energetic and cannot well be controlled by cooling from the outside of the digester and therefore a suitable amount of carbon dioxide ice in finely comminuted form is thrown into the reacting mass, whereby the product is cooled below room temperature and a resinous product useful for subsequent molding may be maintained. Suitable solvents may be added either before or after the ice application if a varnish is desired. The product may now be used as a varnish or lacquer or may be incorporated with various products such as, for example, pyroxylin lacquers or may be mixed or impregnated into suitable filling materials. The product is extremely reactive and will continue its reaction at room temperature without bubbling and will produce a clear, transparent, strong, resinous product. While preferably maintaining the cooling until the final molding operation, by either applying external cooling means or by the additional application of carbon dioxide ice the mass may be utilized for various molding operations.

The reaction may be carried out for a long length of time at ordinary room temperature or it may be materially speeded up by being molded in hot dies at elevated temperatures, under which conditions the curing time is very rapid. Greater speed may be obtained by incorporating with the ground or comminuted powder an additional amount of an active methylene body such as formaldehyde, paraformaldehyde, hexamethylenetetramine, etc.

Example No. 3

Resorcin _____ 55
Paraformaldehyde _____ 30
Alcohol, ordinary denatured, Formula No. 5_____ 30

Place contents into a suitable digester equipped with reflux condenser, a suitable stirring device and suitable openings for the introduction of the raw materials and removal of the finished products. Heat the material to a boil, and under these conditions a varnish product will be formed in about 20 minutes which will have a suitable viscosity for impregnation into various filler materials. The viscosity of the product must be carefully watched, as the material will go rather rapidly to its final hard, set and infusible form. Cooling the mass down to room temperature will not produce a stable product as the material will go to its final infusible form at ordinary room temperature in a comparatively few hours. However, if the liquid is thoroughly cooled as by means of a suitable refrigerator or by means of suitable ammonia pipes, or if the carbon dioxide ice is applied, the material may be kept on hand indefinitely. The product may then be mixed in any suitable way with the filling materials, the temperature, however, being kept down throughout this operation or until the product is ready for use. The product is extremely reactive and molded pieces may be obtained therefrom with great rapidity.

Example No. 4

Resorcin _____ 50
Formaldehyde _____ 37

All parts by weight. The proportion of ingredients is on the basis of equimolecular weights. The materials are placed into a suitable Pyrex beaker or, for that matter, any suitable digester provided with suitable condensers and stirring devices. However, when made in a small way a Pyrex beaker is most suitable as there is practically no liberation of formaldehyde even through the reaction is carried out in the open. The contents of the beaker are heated in a water bath for a period of about 10 minutes. There is no separation into two layers, the water of solution and condensation remaining in the product, but there is no appearance of milkiness as would ordinarily be expected as in a reaction between formaldehyde and ordinary phenol. At the end of the 10 minute period or before a rubbery stage has been reached a suitable quantity of carbon dioxide ice is added to cool the mixture down quickly as the mass is heavy and it is extremely difficult to cool the product from the exterior. By maintaining the cooling action which may from now on be supplemented by external cooling as in a suitable refrigerator or any other suitable means, the product will remain in its potentially reactive form without undergoing further reaction or polymerization. Suitable solvents such as alcohol, acetone, furfural, furfur-alcohol, etc., may be added and a very good varnish may be produced. If the product as it issues from the digester is emptied into a suitable glass beaker or tube, the $CO_2$ ice will gradually disappear, there will be no sign of bubbles, the water of solution will remain therein, and the product will grdaually harden so that in a few hours a clear, transparent resin is produced, free from blow-holes, bubbles, etc. The water remaining, however, is objectionable and this may be removed in the digester preferably by distillation under vacuum, the temperature of the digester being maintained as low as possible. Under actual use, however, where the products are to be introduced into various fillers and are to be used in thin sections, the water may be more readily removed because of the thin structure or by any suitable drying means as under vacuum. If, in place of the watery formaldehyde the hydrates of formaldehyde are used, as, for example, gaseous formaldehyde or paraformaldehyde or various dry active methylene bodies, there will be no difficulty encountered if a small quantity of water should be present. The reaction shows no appreciable water formed where anhydrous products of this type are used and if there are any formed they are not of enough consequence to cause any trouble even when the product is used for electrical insulation.

*Example No. 5*

| | |
|---|---|
| Phenol | 100 |
| Furfural | 100 |
| HCl | 5 |

All parts by weight. The materials are weighted out into a suitable Pyrex beaker or may be placed into a suitable covered digester. Before the catalyst, the hydrochloric or sulphuric acid, is added the mixture of phenol and furfural is cooled with dry ice, the acid is then added and the cooling medium introduced in order that the reaction be moderated and that it proceed slowly. Synthetic water of reaction may be removed. By cooling the reagents sufficiently there will be no reaction between the phenol and furfural. This will occur at a temperature somewhat near the freezing point of the mixture. The products may be introduced into various filling materials or impregnated into paper or textile products before the reaction has started to take place or after the reacted product has been produced. After the material has been incorporated into suitable filling or extending bodies, external cooling is all that need be given the product. The materials will go to infusibility at ordinary room temperature or they may be reacted more rapidly by being molded under the combined action of heat and pressure. The product will go to infusibility rapidly without the addition of any hardening agents. However, suitable hardening agents may be added, such as hexamethylenetetramine, paraformaldehyde or other active methylene bodies. This is preferably done after the resin has been formed or after the reacting bodies have been impregnated into the fillers.

*Example No. 6*

A similar product made in accordance with Example No. 5 is impregnated into paper sheets such as cotton or kraft stock or into other fillers, or used as a lacquer before the resin formation has been allowed to take place, and therefore the phenol and furfural act as their own solvents. After the impregnation has taken place the catalyst used, which may be either an acid or a base, will convert the product to a resinous body in situ. When a mineral acid is used as a catalyst it will be found that the impregnated sheets first have a brown color which gradually changes from green black to black as the reaction proceeds. At this point the combination of furfural and phenol has been completed and the treated product may be dried, if desirable, to eliminate water of condensation. The products may now be molded into various shapes or the treated product may be coated or incorporated with an ordinary synthetic resin or varnish relatively stable at room temperature and having an excess of active methylene body such as hexamethylenetetramine as a hardening agent in order that the liberated ammonia may act as a neutralizing agent for the acid present in the acid reaction resin and, furthermore, that the excess methylene bodies may act as hardening agents for the same.

What I claim is—

1. In the art of plastic molding with synthetic resin materials the step of inserting a solidified and cooling gaseous product in a predetermined position in a mass of moldable composition and subsequently heating the mass to cause a gas to be liberated forming internal pressure within said mass resulting in a gaseous core within the mass.

2. In the art of plastic molding with synthetic resins the insertion of a suitable cooling medium capable of producing an abundant quantity of gas within a tablet formed of comminuted molding particles, subsequently heating and forming said tablet into a shaped object while liberating a sufficient quantity of gas to produce a gaseous core for the production of hollow objects.

3. In the art of plastic molding from synthetic resins the step of introducing carbon dioxide ice within a moldable material and subsequently heating and pressing to shape the exterior of the object and to liberate a sufficient gas pressure in order to produce a hollow internal core.

4. The herein described method which comprises providing a body of potentially reactive synthetic resin within a core of a solidified and cooling gaseous product to prevent the premature reaction of the synthetic resin, and subsequently applying heat and pressure to gasify the core and react the synthetic resin to produce a hollow object of desired form.

5. The herein described method which consists in enveloping a core of carbon dioxide ice with a body of potentially reactive synthetic resin to prevent the premature reaction of the synthetic resin and subsequently applying heat and pressure to gasify the core and react the synthetic resin to produce a hollow object of desired form.

Signed at Philadelphia, in the county of Philadelphia and State of Pennsylvania, this twenty-eighth day of July, A. D. 1927.

EMIL E. NOVOTNY.